US006998573B2

(12) United States Patent
Kooken et al.

(10) Patent No.: US 6,998,573 B2
(45) Date of Patent: Feb. 14, 2006

(54) TRANSFORMER MODULE FOR A WELDER

(75) Inventors: Todd E. Kooken, University Hts., OH (US); Robert L. Dodge, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 187 days.

(21) Appl. No.: 10/617,236

(22) Filed: Jul. 11, 2003

(65) Prior Publication Data

US 2005/0006366 A1 Jan. 13, 2005

(51) Int. Cl.
*B23K 9/10* (2006.01)

(52) U.S. Cl. .................................... 219/130.1; 336/186

(58) Field of Classification Search ............. 219/130.1, 219/130.31, 130.32, 130.33, 62; 336/175, 336/186; 363/141
See application file for complete search history.

(56) References Cited

U.S. PATENT DOCUMENTS 2,600,057 A * 6/1952 Kerns ......................... 336/172
2,719,275 A * 9/1955 Hartmann ................... 336/105
3,004,135 A * 10/1961 Diener et al. ................. 219/62
4,338,657 A * 7/1982 Lisin et al. ................. 336/175
4,942,353 A 7/1990 Herbert et al.
5,023,423 A 6/1991 Tsujii et al.
5,341,280 A 8/1994 Divan et al.
5,351,175 A 9/1994 Blankenship
5,737,211 A 4/1998 Hirai et al.
5,999,078 A 12/1999 Herbert
6,665,183 B1 * 12/2003 Shikata et al. .............. 363/141
2002/0075119 A1 6/2002 Herbert

FOREIGN PATENT DOCUMENTS

DE 1 091 665 10/1960
EP 0 601 225 A1 12/1992
GB 1 385 667 3/1975

OTHER PUBLICATIONS

International Search Report corresponding to European Application No. EP 04 00 8680.
Australian Examiner's First Report dated Dec. 15, 2004.

* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc welder comprising a high switching frequency inverter for driving the primary of an output transformer where the output transformer has a plurality of modules forming the secondary windings of the transformer and each of the modules comprises a first coaxial set of concentric, telescoped tubes separated by a tubular insulator, a second coaxial set of concentric, telescoped conductive tubes separated by a tubular insulator wherein the sets each have an elongated central passage for accommodating the primary and a conductor connecting the tubes into a series circuit. These modules form a transformer for such welder.

42 Claims, 7 Drawing Sheets

TRANSFORMER MODULE FOR A WELDER

The present invention relates to the art of electric arc welding and more particularly to a modular transformer operated by high frequency and having an output for welding and a module for such transformer.

INCORPORATION BY REFERENCE

The invention relates to a module that can stand alone or be combined with similar modules to form a high frequency transformer for use in electric arc welding. The actual electrical circuit for the transformer can vary; however, a representative transformer circuit is shown in Blankenship U.S. Pat. No. 5,351,175 incorporated by reference herein as background information. The transformer module is an assembly which forms the secondary of a transformer, wherein the primary is interleaved through one or more modules. If more than one module is used, they are used in a matrix transformer. This technology is well known and is shown in Herbert U.S. Pat. No. 4,942,353 which is incorporated herein so that disclosure of the matrix transformer technology need not be repeated. In Herbert 5,999,078 two adjacent magnetic cores are provided with secondary windings and primary windings wherein each module includes a half turn of the secondary winding. These modules merely provide a flat conductive strip through a core to be connected as a part of a secondary winding. The primary winding is then interleaved through the modules in accordance with standard matrix transformer technology. A similar module having several turns in a given core is shown in Herbert publication No. 2002/0075119. This patent and publication are incorporated herein to show prior art technology regarding a module used for a secondary winding in a matrix type transformer. All of these patents are included as background information.

BACKGROUND OF INVENTION

In electric arc welding it is necessary to create high currents from a power source, such as an inverter. To accomplish this objective, the inverter must be operated at a switching frequency which is quite high, such as 40 kHz so that the size of the components and the cost of the components are low. To create high currents from power sources using high switching frequencies, it is normal to merely employ an output transformer involving a primary and secondary. Consequently, the transformer has to be relatively robust in construction and capable of generating and handling high currents. Such transformers are quite expensive and bulky.

THE INVENTION

The present invention relates to electric arc welding wherein a power source is operated at high switching frequency, such as 40 kHz. In accordance with the invention, the output transformer of this electric arc welder is a coax configuration where the secondary windings of the output transformer are constructed so the primary winding can be passed through one or more module to produce a highly coupled transformer with a very compact construction and enhanced heat dissipation characteristics. The invention is directed to a novel and unique module construction allowing a single module or multiple modules to be applied to an electric arc welder. A single or multiple modules are used dependent on the power output requirements.

The module of the present invention comprises a first coaxial set of concentric, telescoped conductive tubes separated by a tubular insulator, a second coaxial set of concentric telescoped conductive tubes separated by a tubular insulator and a magnetic core around each of the tube sets so that each set of conductive tubes has an elongated central passage for accommodating at least one primary winding. This module includes a conductor connecting the tubes of the sets into a series circuit so the output of each module is directed to a rectifier for conversion into a portion of the output current necessary for electric arc welding. The current from all of the modules are summed to obtain a welding current.

By using this unique module design, the module can be used by itself or as a plurality of modules can be interleaved with one or more primaries to create a welding current having an output capability in excess of 1000 amperes.

The primary object of the present invention is the provision of a modular transformer for an electric arc welder.

A further object of the present invention is the provision of a module, as defined above, which module involves parallel coaxial tubes connected in series and defining central passages for a primary or primaries of the output transformer of a power source used in electric arc welding.

Yet another object of the present invention is the provision of a module, as defined above, which module employs two concentric conductive tubes connected in series in a single module to define a multi-turn secondary winding for an output transformer of an electric arc welder.

A further object of the present invention is the provision of a matrix transformer at the output of a power source used in electric arc welding.

These and other objects and advantages will become apparent from the following description taken together with the accompanying drawings.

PREFERRED EMBODIMENT

Figure 1:
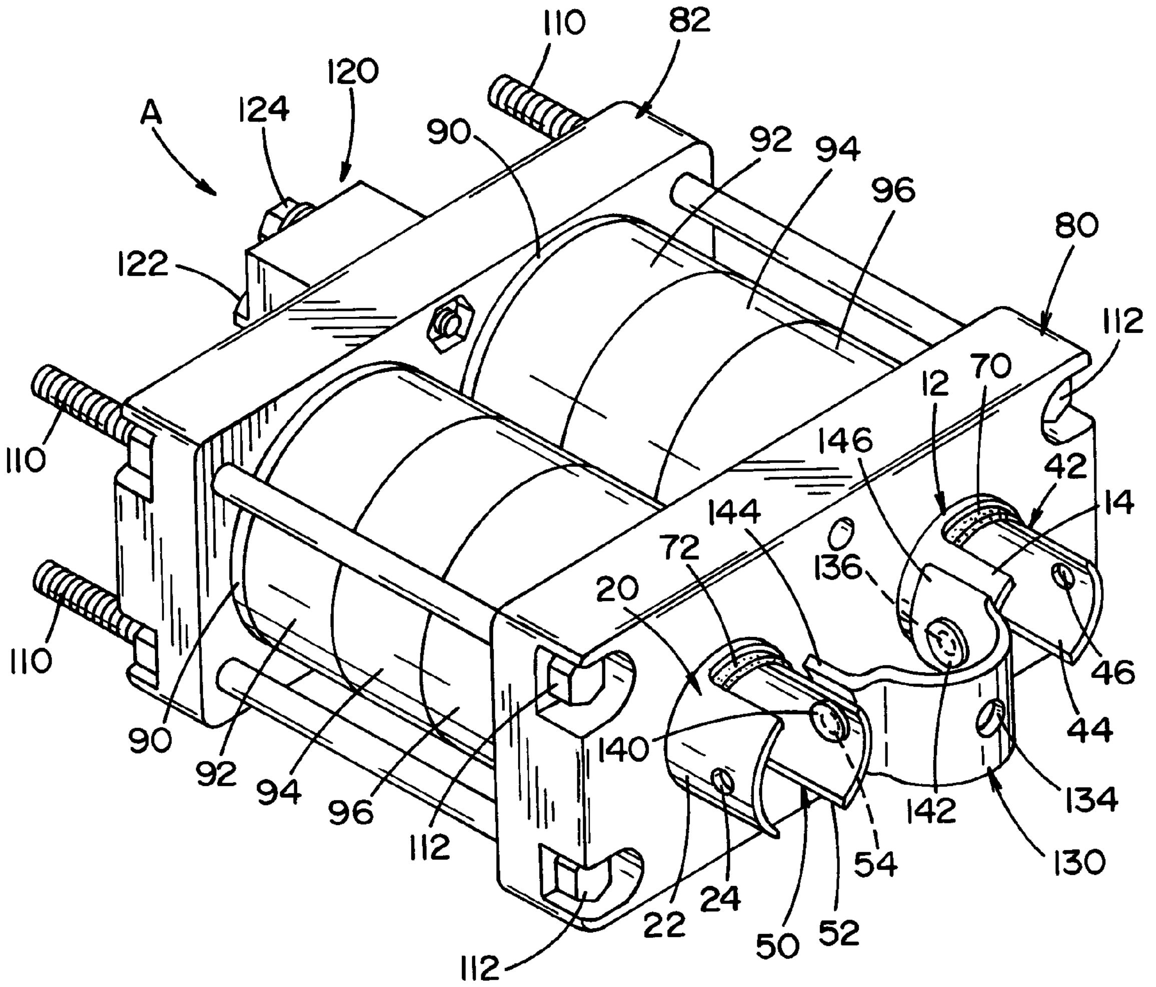
FIG. 1 is a pictorial view of a module constructed in accordance with the present invention.
Figure 2:
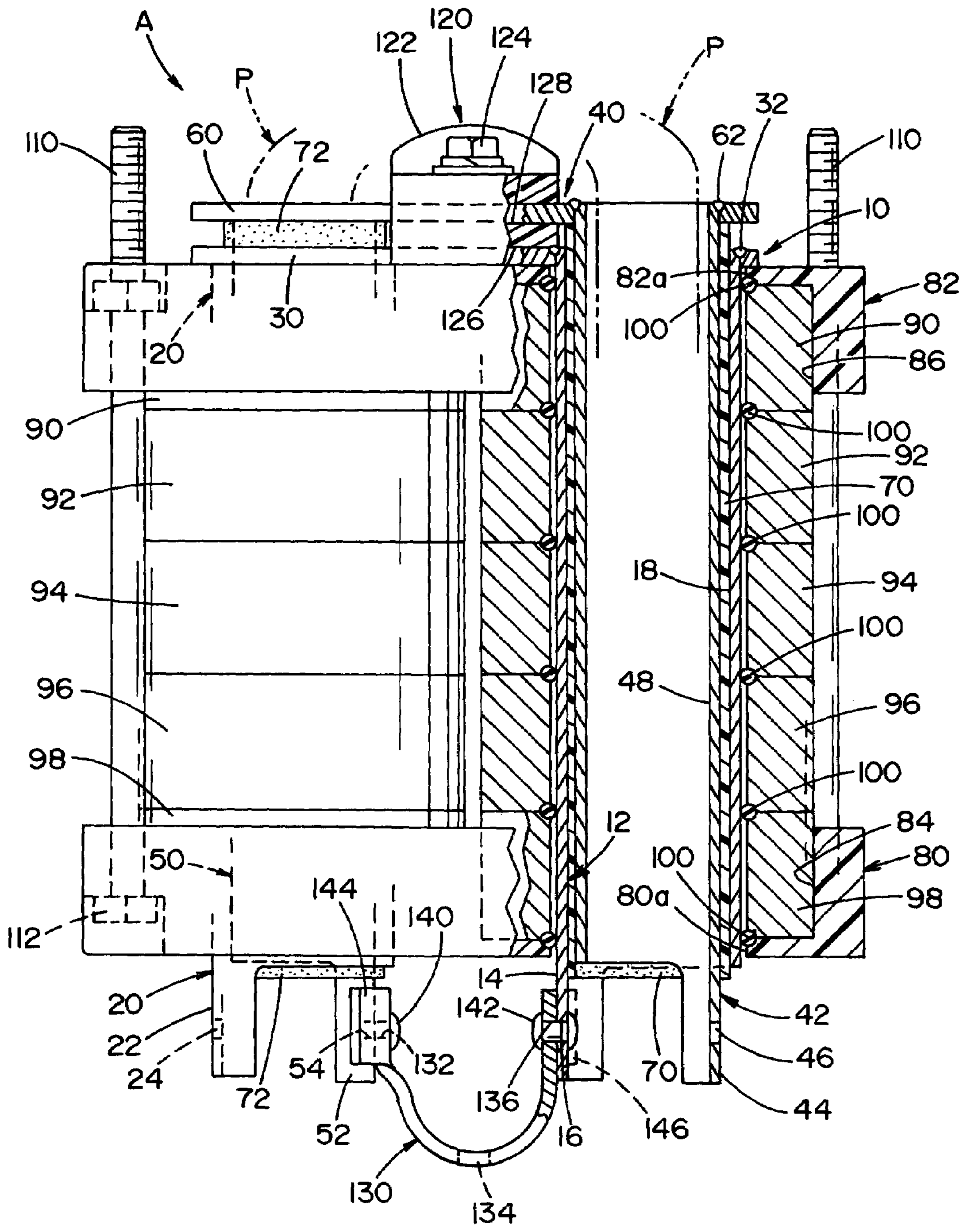
FIG. 2 is a side elevational view of the module showing in partial cross-section one side of the concentric tube construction.

A novel secondary module constitutes the basic building block of the present invention. The preferred embodiment is shown in FIGS. 1 and 2 wherein secondary module A is constructed to receive one or more primary windings P through a pair of parallel cylindrical openings designed to accommodate one or more primary windings in parallel relationship. Module A is used both as a single secondary winding, or as one of several modules in a matrix transformer where primary winding P is interleaved through two or more modules A as will be explained later. In the preferred embodiment, module A is formed from a first assembly 10 with a first tube 12 terminating in a lower tab 14 having a connector hole 16. Central passage 18 in tube 12 is used as the primary winding passage when module A includes only the first assembly 10. As will be explained, the preferred embodiment has two assemblies formed by telescoping two coaxial conductive tubes usually formed from copper and telescoped around each other. Second tube 20 of first assembly 10 includes a terminal tab 22 with a lower connector hole 24 and has a central cylindrical passage 26. To fix tube 12 with respect to tube 20, so the tubes are in parallel and in spaced relationship, a first jumper strap 30 is provided. Two space holes in strap 30 surround the first end of tubes 10, 20 so weld joints 32 fix the tubes into the holes. As so far described, the jumper strap is at one end of the tubes and the tubes are parallel and spaced with the second ends having protruding tabs 14, 22, respectively. As will be explained later, only assembly 10 may be used; however, the preferred embodiment involves a coaxial relationship involving a second assembly 40 essentially the same as assembly 10 with tubes having lesser diameter so that they telescope into tubes 12, 20. Assembly 40 includes third tube 42 having a lower tab 44 with a connector hole 46 and a central passage 48 to accommodate winding P. A fourth tube 50 has a lower tab 52 with a connector hole 54 so that the third and fourth tube can be joined by a second jumper strap 60 provided with spaced openings surrounding the top or first end of tubes 42, 50. Weld joint 62 around the tubes joins the tubes into the holes of jumper strap 60. This second assembly is quite similar to the first assembly except the diameters of tubes 42, 50 are substantially less than the diameters of tubes 12, 20. In the cylindrical gap between the tubes, a Nomex insulator sleeve or cylinder 70, 72 is provided. These cylindrical insulator sleeves electrically isolate the coaxial tubes forming the basic components of module A. Plastic end caps 80, 82 are provided with two transversely spaced recesses 84 in cap 80 and two spaced recesses 86 in cap 82. Only one of the recesses 84, 86 is illustrated in FIG. 2. The other recesses are the same and need not be illustrated. The construction of the left coaxial assembly of module A is essentially the same as the construction of the right coaxial assembly as shown in cross-section in FIG. 2. As illustrated, between cap recesses 84, 86 there are provided a plurality of ferrite donut-shaped rings or magnetic cores 90–98. To center the cores there are provided a number of silicon washers 100 so bolts 110 having heads 112 clamp the end caps together. This action holds the spaced rings around the coaxial tubes of module A. Assemblies 10, 40 with the coaxial tubes are held onto module A by an upper plastic nose 120 having an arcuate primary winding guide 122. The nose is held onto end plate 82 by transversely spaced bolts 124. Nose 120 includes laterally spaced slots 126, 128 so that the nose can be moved from one edge of assemblies 10, 40 to the center position by riding on spaced jumper straps 30, 60. When in the center of the module, the plastic nose is bolted to end cap 82. This clamps assemblies 10, 40 onto module A in the position shown in FIG. 2 and holds straps 30, 60 in spaced relationship. The coaxial tubes are aligned by holes **80*a*, 82*a* concentric with cylindrical recesses 84, 86 in end caps 80, 82, respectively. Two of these holes are located in each of the end caps. Washers 100 center the coaxial tubes in the cylinder formed by core rings 90–98**.

Figure 3:
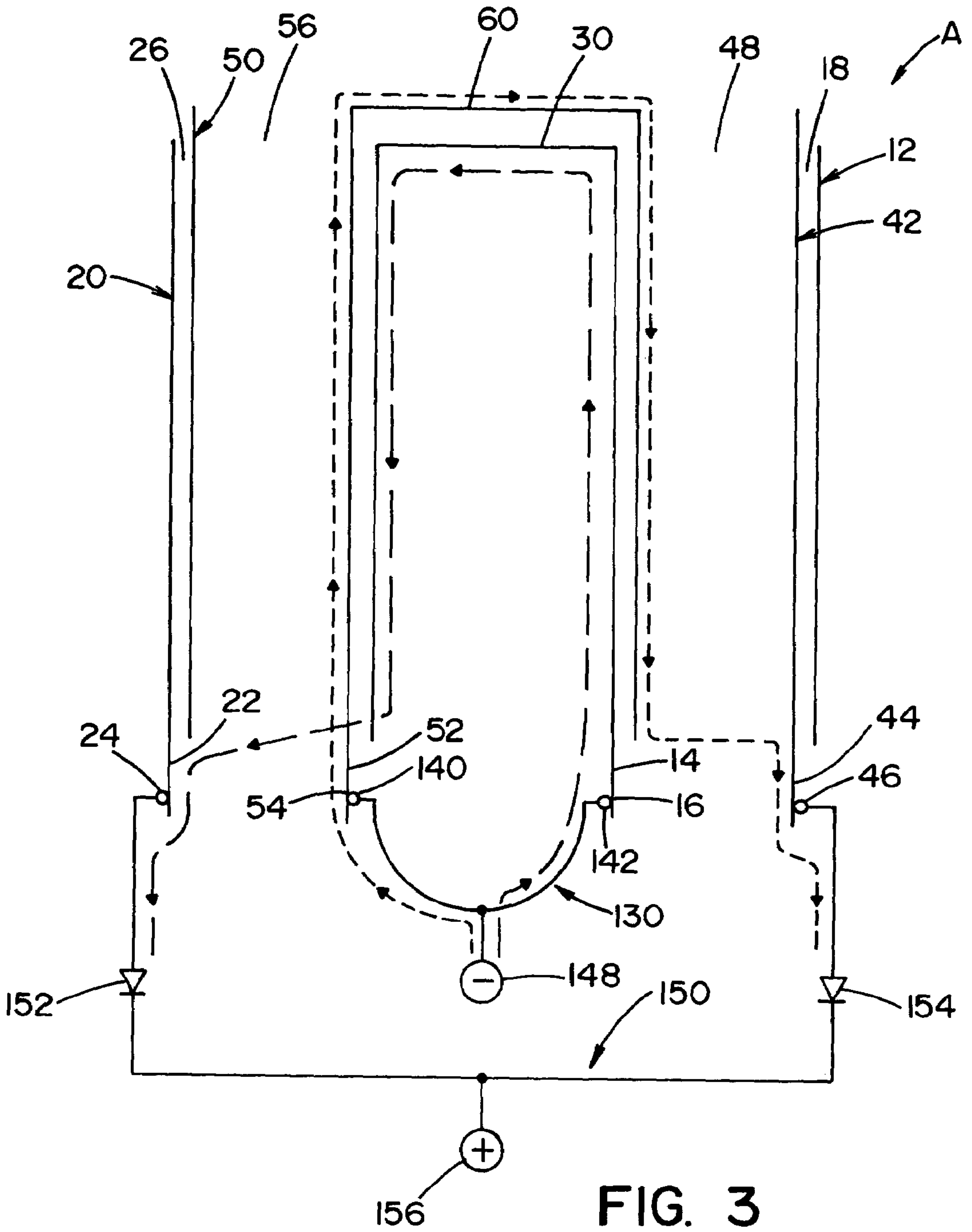
FIG. 3 is a schematic wiring diagram illustrating the current flow in a module as shown in FIGS. 1 and 2.
Figure 4:
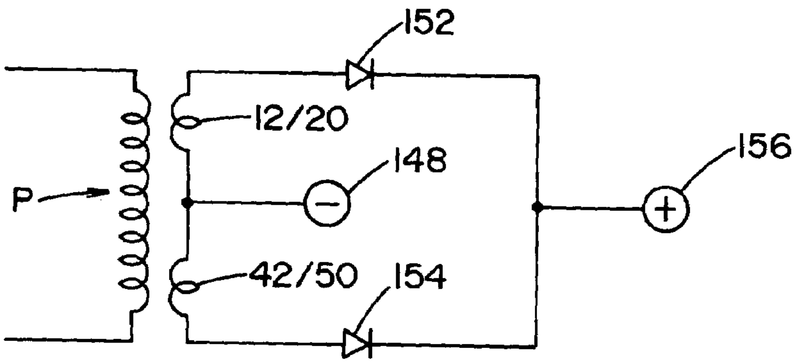
FIG. 4 is a wiring diagram of the module shown in FIGS. 1–3 in conjunction with a single primary winding interleaved through the passages of the parallel concentric tube module.

In the preferred embodiments, module A is connected as a secondary for a high frequency transformer driven by a primary from an inverter. This electrical arrangement involves connecting assemblies 10, 40 in series by a center tap connector 130 having holes 132, 134 and 136. A rivet 140 connects hole 132 with tab 52, while rivet 142 connects hole 136 with tab 14. To stabilize center tap 130, the ends of the tap are provided with cylindrical wings 144, 146, best shown in FIG. 2. As shown in FIG. 3, module A is connected to rectifier 150 having diodes 152, 154 and an output terminal 156. By this arrangement, the single coaxial module allows primary winding or windings P to be leaved through cylindrical passages 48, 56 so the module is a secondary of a high frequency transformer. This is a normal use of the present invention when employed for an electric arc welder. A simplified wiring diagram of the embodiment is illustrated in FIG. 4 to show primary winding P and secondary windings 12/20 and 42/50.

Figure 5:
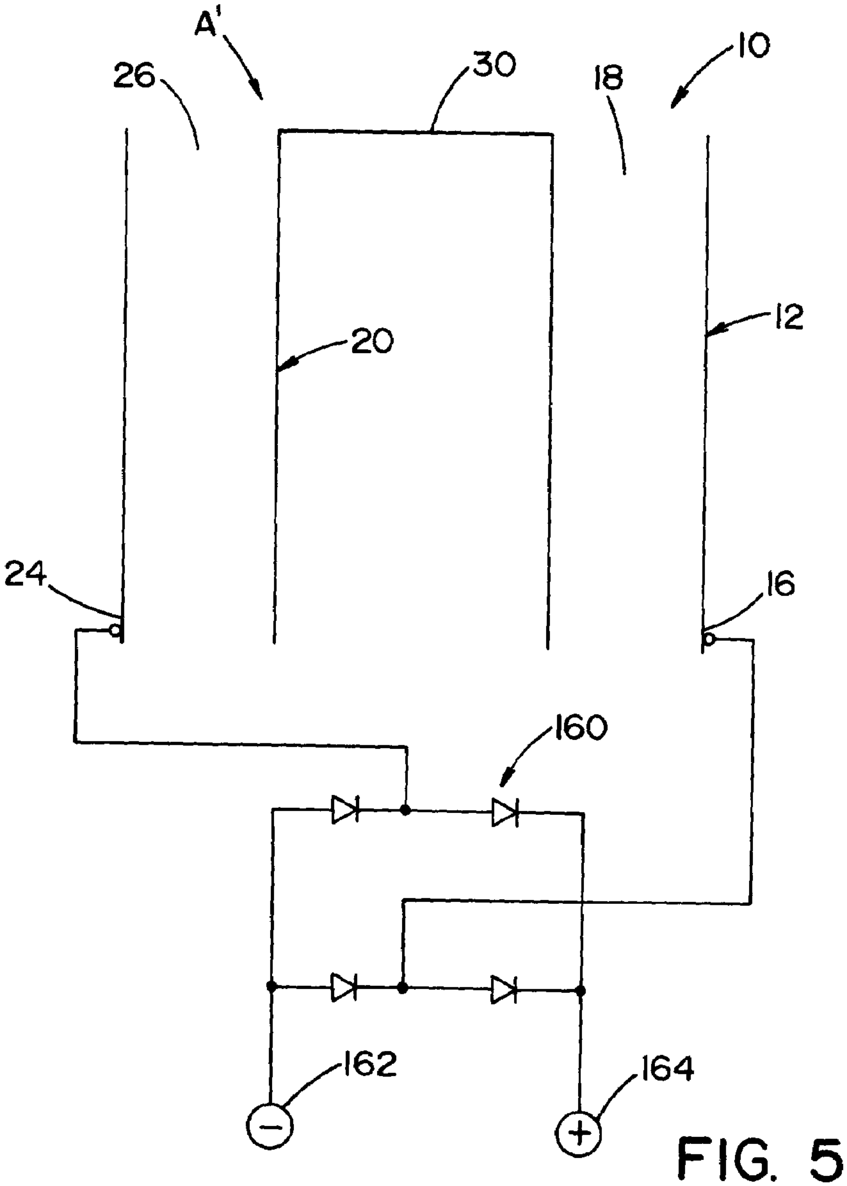
FIG. 5 is a schematic wiring diagram similar to FIG. 3 illustrating a modified module utilizing two parallel tubes with a full wave output rectifier.

In accordance with an aspect of the invention, module A' shown in FIG. 5 includes only tube assembly 10 with only conductive tubes 12, 20 that define terminal ends 16, 24. These terminals are connected across a full wave rectifier 160 having output terminals 162, 164. Tubes 12, 20 could be a single tube; however, in the invention two tubes are used to minimize inductance so the primary winding from the inverter is leaved around jumper 30 through center winding accommodating openings 18, 26.

Figure 6:
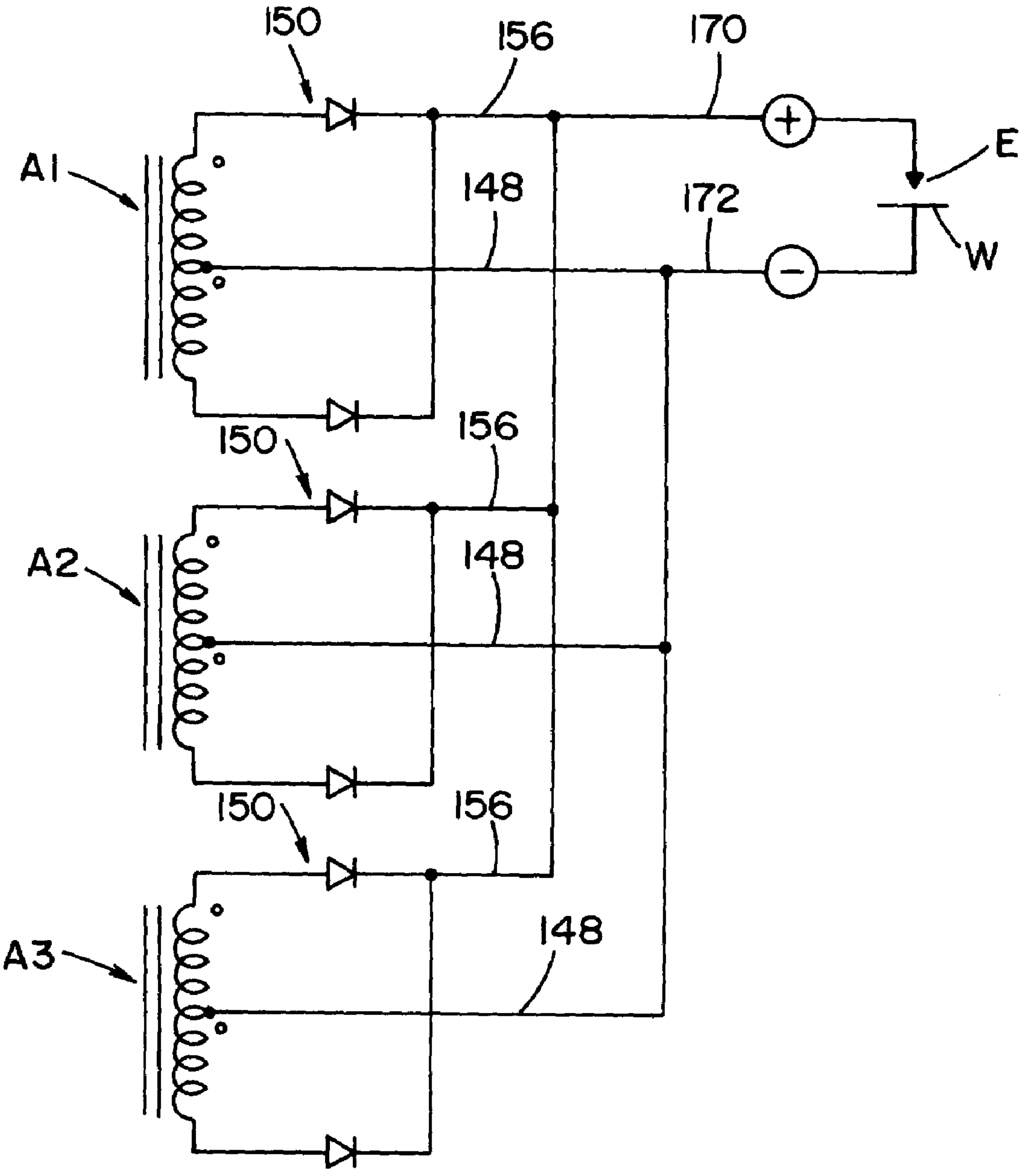
FIG. 6 is a wiring diagram showing three modules as illustrated in FIGS. 1–3 connected as the output of the power transformer in an electric arc welder.
Figure 7:
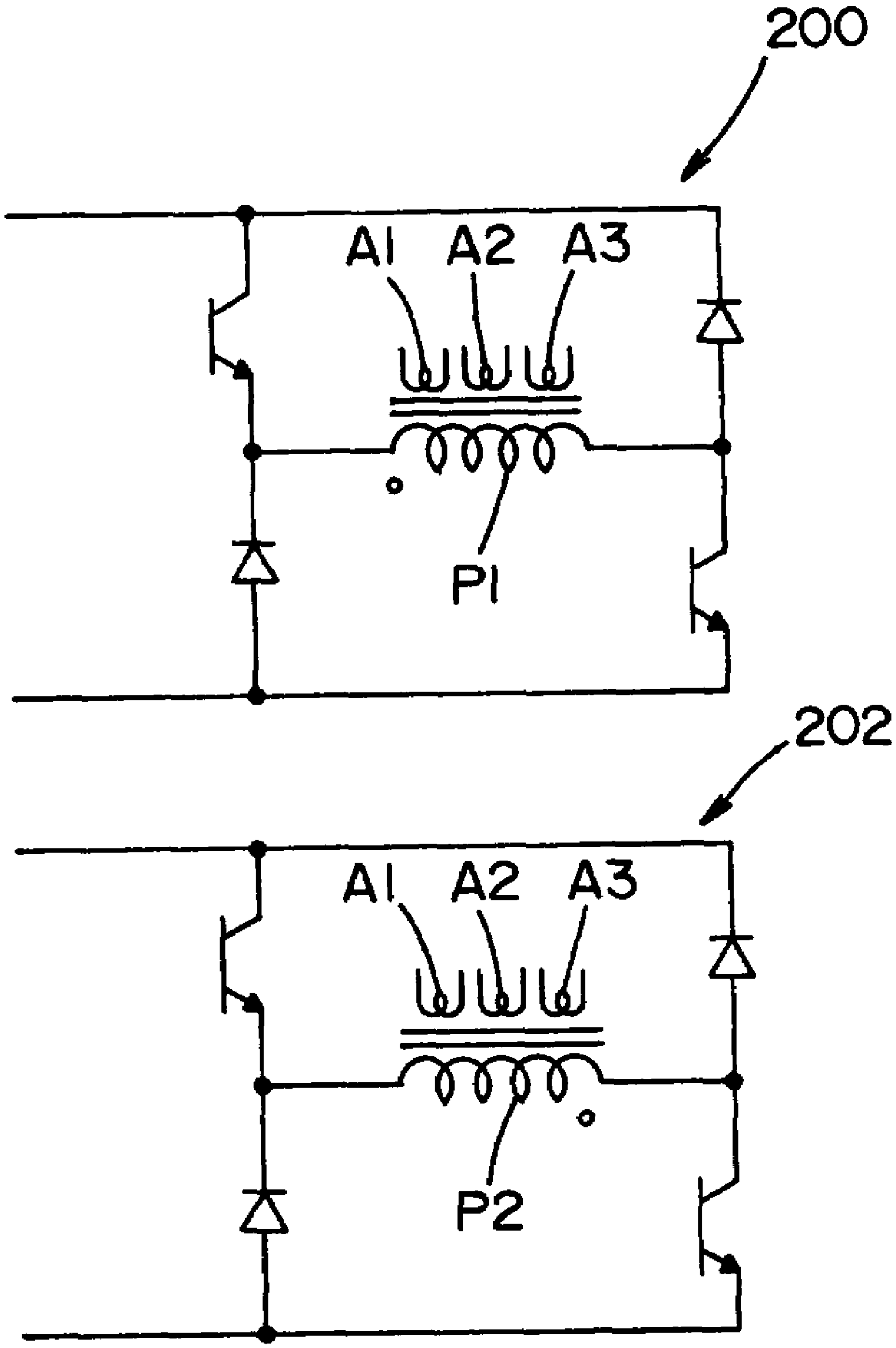
FIG. 7 is a schematic wiring diagram of the high switching speed inverter used for the primary winding and/or windings that are interleaved in the modules schematically represented in FIG. 6 and shown in detail in FIGS. 1–3 and in FIG. 8; and, FIG. 8 is a pictorial view of three modules connected as shown in FIG. 6 utilizing a plurality of modules as disclosed in FIGS. 1–3.
Figure 8:
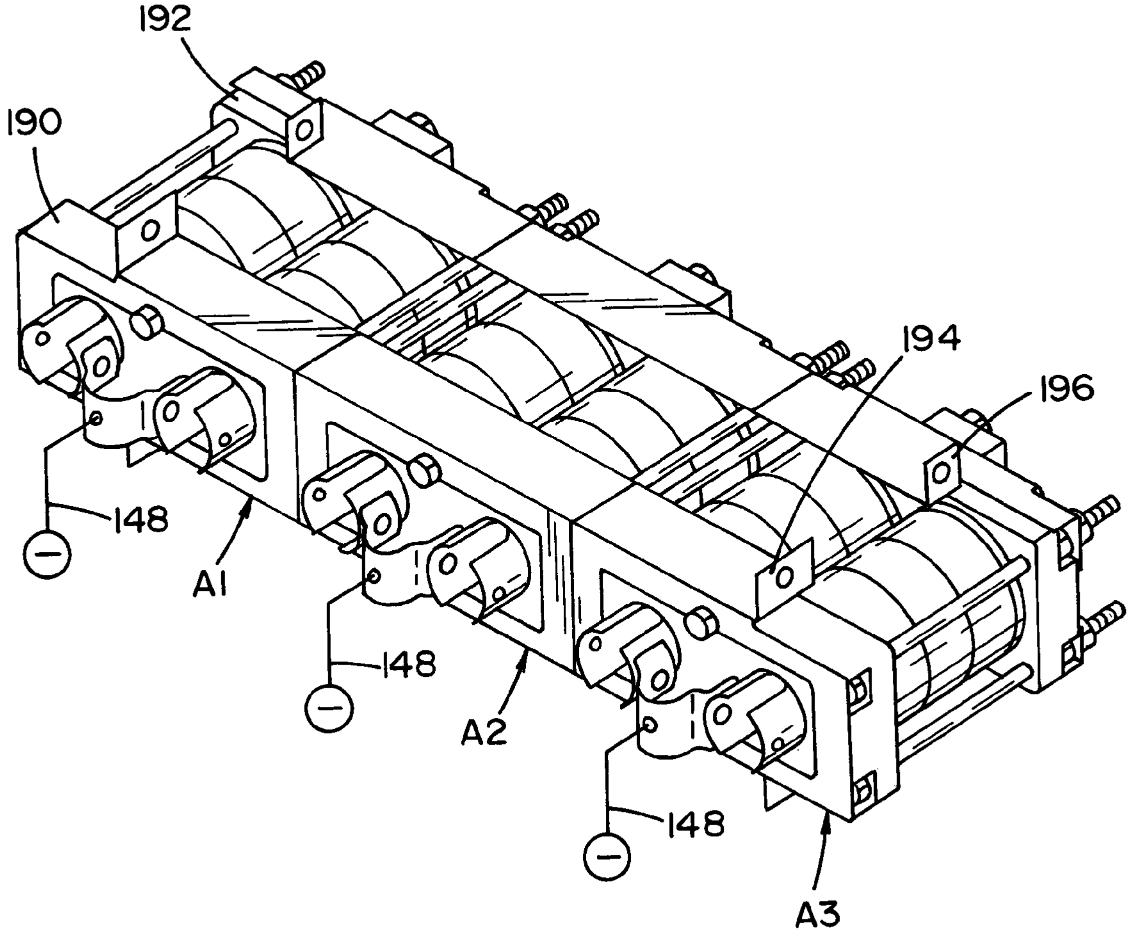

A plurality of modules A are arranged to provide a high frequency transformer for a welder represented by electrode E and workpiece W in FIG. 6. This matrix transformer concept is illustrated schematically in FIGS. 6–8 wherein modules A1, A2 and A3 are joined together by end straps 190, 192 in one end of the multiple module assembly shown in FIG. 8 and end straps 194, 196 on the other end. Bolts clamp a frame around modules A1, A2 and A3 to assemble them into alignment, as shown in FIG. 8 wherein each set of passages 48, 56 is in parallel and are aligned in side-by-side relationship. The wiring diagram for the assembly shown in FIG. 8 is illustrated in FIG. 6 wherein terminals 156 are connected in parallel at terminal 170 and center tap 148 is connected in parallel at terminal 172. The primary windings from one or more inverters are shown schematically in the wiring diagram of FIG. 7. Inverter 200 creates an AC current in primary P1. In a like manner, inverter 202 provides an AC current in primary P2. These two primaries are interleaved together through modules A1, A2 and A3. In practice, two primary windings are used in the matrix transformer of FIG. 8; however, a single winding is also used in this type of matrix transformer. FIGS. 6–8 merely illustrate that the coaxial secondary transformer module A of FIGS. 1–3 can either be used as a single secondary winding or as parallel secondary windings in a matrix transformer. Other arrangements use module A as a secondary winding for a transformer between an inverter and a welding operation. The tubular, coaxial conductors disclosed in module A are sometimes replaced by an elongated ribbon helix around the center axis of the individual tubes. Such helix configuration still provides the coaxial relationship between the concentric tubes. The term "tube" defines a continuous tube conductor, as so far described, or the helix tube as used in the alternative embodiment.

Having thus defined the invention, the following is claimed:

1. A module forming the secondary winding of a high frequency transformer, said module comprising a first conductive tube with first and second ends; a generally parallel closely adjacent second conductive tube with first and second ends, said tubes each having a central elongated passage accommodating one or more primary windings; a magnetic core surrounding each of said tubes; a jumper strap joining said first ends of said tubes; and, a circuit forming connector at said second ends of said tubes.

2. A module as defined in claim 1 wherein each of said magnetic cores each comprise a plurality of doughnut-shaped rings around one of said tubes.

3. A module as defined in claim 2 including a nose piece over said jumper strap with a guide surface between said central passages of said parallel tubes.

4. A module as defined in claim 3 wherein said jumper strap is a center tap.

5. A module as defined in claim 2 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages for accommodating said primary winding or windings with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

6. A module as defined in claim 5 wherein said second end of one of said first and second tubes and one end of one of said third and fourth tubes are connected to a rectifier.

7. A module as defined in claim 5 including an insulator between said jumper straps.

8. A module as defined in claim 2 wherein said jumper strap is a center tap.

9. A module as defined in claim 1 including a nose piece over said jumper strap with a guide surface between said central passages of said parallel tubes.

10. A module as defined in claim 4 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages accommodating said primary winding or windings with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

11. A module as defined in claim 10 wherein said second end of one of said first and second tubes and one end of one of said third and fourth tubes are connected to a rectifier and to be an electrode element, and said second end of the other of said first and second tubes and one end of the other of said third and fourth tubes are connected to a work piece of a welding operation.

12. A module as defined in claim 10 including an insulator between said jumper straps.

13. The module of claim 10 wherein the center tap connector is connected to a negative terminal of a rectifier.

14. The module of claim 13 wherein a second end of the other of said first and second tubes and a second end of one of said third and fourth tubes are connected in parallel to a positive terminal of a rectifier.

15. The module of claim 10 wherein the center tap connector and said tubes connected thereto have holes in registry with one another for receiving at least one suitable fastener therethrough.

16. The module of claim 10 wherein the center tap connector includes wings matingingly received about said tubes connected thereto to stabilize the center tap connector.

17. A module as defined in claim 9 wherein said jumper strap is a center tap.

18. A module as defined in claim 1 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages for accommodating said primary winding or windings with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

19. A module as defined in claim 18 wherein said second end of one of said first and second tubes and one end of one of said third and fourth tubes are connected to a rectifier.

20. A module as defined in claim 18 including an insulator between said jumper straps.

21. A module as defined in claim 1 wherein said jumper strap is a center tap.

22. A module forming the secondary winding of a high frequency transformer, said module comprising a first coaxial set of concentric, telescoped conductive tubes separated by a tubular insulator; a second coaxial set of concentric, telescoped conductive tubes separated by a tubular insulator; a magnetic core around each of said sets, said sets each having an elongated central passage accommodating at least one primary winding, and conductor connecting said tubes of said sets into a series circuit.

23. A module as defined in claim 22 wherein each of said magnetic cores comprises a plurality of doughnut-shaped rings around one of said tubes.

24. A module as defined in claim 23 wherein said conductive tubes are formed by an elongated ribbon helixed around a central axis of said tube.

25. A module as defined in claim 22 wherein said conductive tubes are formed by an elongated ribbon helixed around a central axis of said tube.

26. An electric arc welder comprising a high switching frequency inverter for driving the primary of an output transformer, said output transformer having a plurality of modules forming the secondary windings of said transformer, each of said modules comprising a first coaxial set of concentric, telescoped tubes separated by a tubular insulator, a second coaxial set of concentric, telescoped conductive tubes separated by a tubular insulator, said sets each having an elongated central passage accommodating said primary, and a conductor connecting said tubes into a series circuit.

27. A welder as defined in claim 26 wherein said tubes of said modules are each connected to a rectifier to create a positive and negative current output and a circuit connecting said outputs in parallel.

28. An electric arc welder comprising a high frequency inverter for driving the primary of an output transformer with AC current, said output transformer having a plurality of modules forming the secondary windings, each of said modules having parallel conductive tubes connected in series and defining a pair of parallel elongated central passages accommodating said primary winding.

29. A welder as defined in claim 28 wherein said tubes of said modules are each connected to a rectifier to create a positive and negative current output and a circuit connecting said outputs in parallel.

30. A welder as defined in claim 29 wherein said tubes of said modules are formed by an elongated ribbon helixed around a central axis of said tube.

31. A welder as defined in claim 28 wherein said tubes of said modules are formed by an elongated ribbon helixed around a central axis of said tube.

32. An electric arc welder comprising a high switching frequency inverter for driving the primary of an output transformer, said output transformer having a module forming the secondary winding of said transformer, said module comprising a first coaxial set of concentric, telescoped tubes separated by a tubular insulator, a second coaxial set of concentric, telescoped conductive tubes separated by a tubular insulator, said sets each having an elongated central passage for accommodating said primary, and a conductor connecting said tubes into a series circuit.

33. A welder as defined in claim 32 wherein said tubes of said module are each connected to a rectifier to create a positive and negative current output and a circuit connecting said outputs in parallel.

34. An electric arc welder comprising a high frequency inverter for driving the primary of an output transformer with AC current, said output transformer having a module forming the secondary winding, said module having parallel conductive tubes connected in series and defining a pair of parallel elongated central passages accommodating said primary winding.

35. A welder as defined in claim 34 wherein said tubes of said module are each connected to a rectifier to create a positive and negative current output and a circuit connecting said outputs in parallel.

36. A welder as defined in claim 35 wherein said tubes of said module are formed by an elongated ribbon helixed around a central axis of said tube.

37. A welder as defined in claim 34 wherein said tubes of said module are formed by an elongated ribbon helixed around a central axis of said tube.

38. A high frequency transformer for an electric arc welder with an inverter power source, said transformer including a number of modules removable from one another, each comprising a secondary winding section, said section of said number of modules interconnected and a primary winding through each of said modules, each of said number of modules further comprising a first conductive tube with first and second ends, a generally parallel closely adjacent second conductive tube with first and second ends, said tubes each having a central elongated passage accommodating one or more primary windings, a magnetic core surrounding each of said tubes, said first ends of said tubes joined together, and a circuit forming connector at said second ends of said tubes.

39. A power source for electric arc welding, said power source includes a high switching speed inverter for driving the primary of an output transformer with AC primary current, said output transformer having a number of modules each with a given current capacity forming the secondary winding of the output transformer, said modules connected in parallel with the total output welding current being the sum of the current capacities of said separate modules, each of said number of modules comprises a first conductive tube with first and second ends; a generally parallel closely adjacent second conductive tube with first and second ends, said tubes each having a central elongated passage accommodating one or more primary windings; a magnetic core surrounding each of said tubes; a jumper strap joining said first ends of said tubes; and, a circuit forming connector at said second ends of said tubes.

40. A power source as defined in claim 39 wherein said total output can exceed about 1,000 amperes.

41. A power source as defined in claim 39 wherein said given current capacities are the same.

42. A power source as defined in claim 39 wherein each of said number of modules includes a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages accommodating said primary winding or windings with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

* * * * *